UNITED STATES PATENT OFFICE.

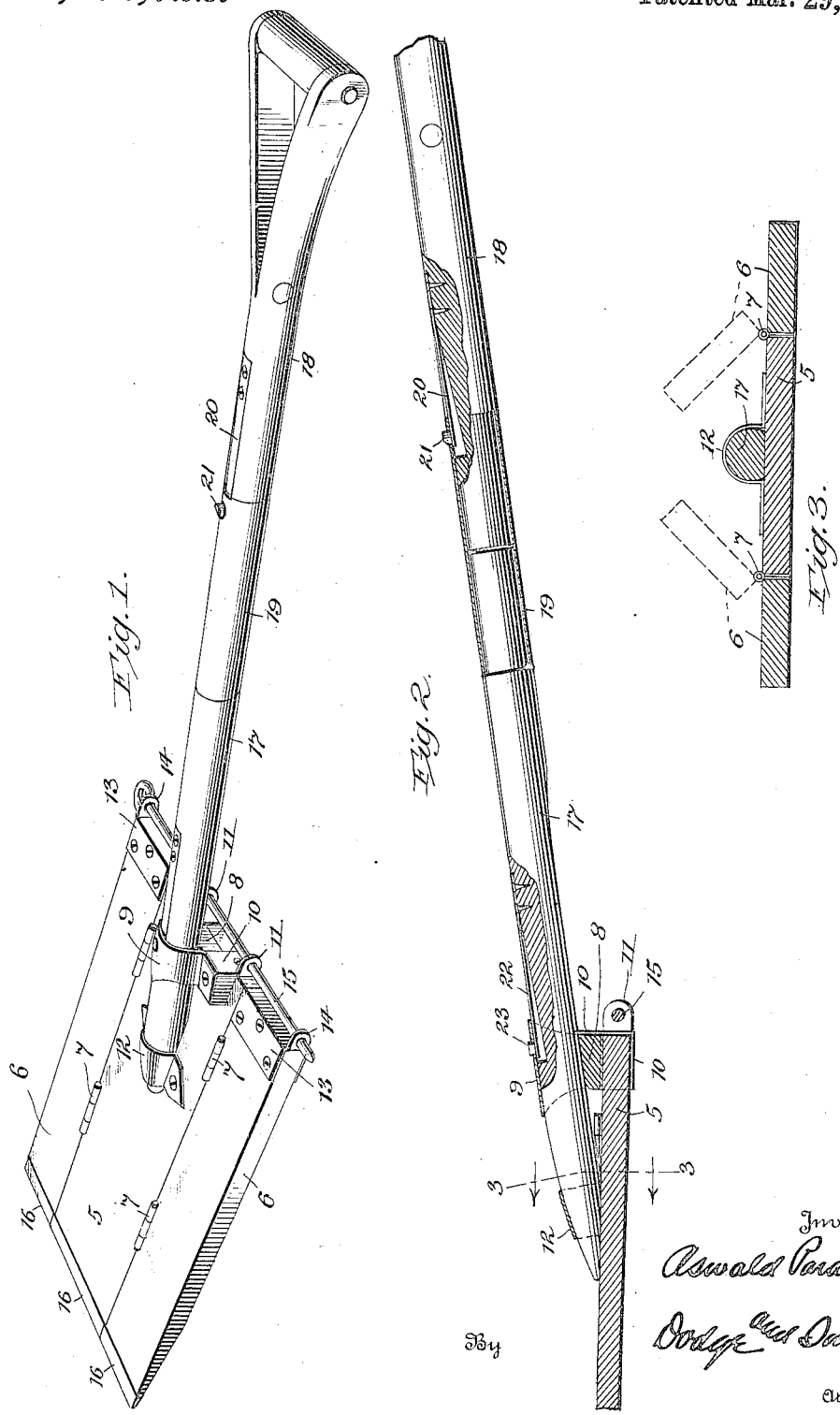

OSWALD PARADIS, OF CENTRAL FALLS, RHODE ISLAND.

SHOVEL.

1,372,722.      Specification of Letters Patent.      Patented Mar. 29, 1921.

Application filed June 29, 1920. Serial No. 392,750.

*To all whom it may concern:*

Be it known that I, OSWALD PARADIS, a subject of the King of Great Britain, residing at Central Falls, in the county of Providence and State of Rhode Island, have invented certain new and useful Improvements in Shovels, of which the following is a specification.

This invention relates to shovels, and particularly, snow shovels.

The object of the invention is to provide a shovel of this type, large enough for practical use, and yet capable of being dismounted and folded so as to occupy a relatively small space. The invention meets the need for a shovel which may conveniently be carried under a seat or in the tool box of an automobile.

I secure the desired result by forming the blade in sections hinged together and provided with means for locking them in extended position, and by using a removable handle which may be separated into sections, each about the length of the blade.

A shovel embodying the invention is illustrated in the accompanying drawings, in which:

Figure 1 is a perspective view of the complete shovel, showing it assembled;

Fig. 2 is an enlarged fragmentary view, partly sectional, showing details of the handle joints and latches; and Fig. 3 is a section on the line 3—3 of Fig. 2 looking in the direction of the arrows.

The blade of the shovel consists of three sections, a middle section 5 and two side sections 6. These are hinged together in any convenient manner, butt hinges 7 being preferred for the purpose because they leave the face of the shovel relatively free from projections. The hinges are so placed that the side sections swing up and toward each other. Mounted at the rear end of the section 5 is a filler piece 8, which also serves as a stiffening batten. Held to this by screws is a sheet metal stamping formed with a loop 9 to receive the handle, and with tie straps 10 which are bent around the rear face of filler piece 8 and rear end of blade section 5 to the lower side of said blade section, where they are held by screws. Each tie strap 10 carries a perforated ear 11 to receive the alinement pin later to be described. Thus a single sheet metal member reinforces the head of the shovel blade, and serves as a socket for the handle and engaging means for the alinement pin. A second sheet metal stamping 12 mounted on blade section 5 by means of screws serves as a socket for the toe of the handle.

The rear ends of the side sections 6 of the shovel blade are reinforced by sheet metal stampings 13 of channel shape. These embrace the rear edge of the blade and are held by screws. Each of the stampings 13 is formed at the outer end with a perforated ear 14. When the shovel sections 5 and 6 are opened out into operative position the ears 11 and 14 aline with each other, and may be held in alinement by the alinement pin 15 inserted through their perforations.

The forward ends of the blade sections are provided with metal or other reinforcements 16 of usual form, and the general proportions of the entire blade may approximate those of snow shovels now in use.

The handle of the shovel is made in any desired number of separable sections, two sections 17 and 18 being shown in the drawing. The joint between sections consists of tubular ferrule 19 fixed to section 17 and adapted to receive the end of section 18. The end of section 18 is retained in ferrule 19 by means of a latch consisting of a spring 20 carrying a stud 21 which enters a hole in ferrule 19 designed to receive it. This latch also holds the sections against relative rotary motion. It may readily be released by depressing spring 20.

The handle section 17 is connected to the blade of the shovel by inserting its end through loop 9 and into loop 12. It is held in place by a latch similar to that just described, and consisting of a spring 22 carrying stud 23 which engages in a hole formed in loop 9 to receive it.

To fold the shovel, springs 20 and 22 are pressed down to release the latches, and the handle sections are then separated from the blade and from each other. Alinement pin 15 is withdrawn and side sections 6 are folded up. The alinement pin and the handle sections may then be laid on blade section 5 between the upturned side sections 6 of the blade, the whole forming a small compact group.

Details of construction, for example, the latches, alinement means, etc., may be modified without departing from the spirit of the invention. Where the wood of the blade is thin it is desirable to use rivets instead of screws, as will be obvious to those skilled in the art. Consequently, I do not limit myself to the specific structural details shown and described, except to the extent specified in the claims.

Having thus described my invention what I claim is:—

1. In a shovel, the combination of a blade comprising a plurality of sections; releasable means for holding said sections in operative relation; and a handle releasably connected to said blade.

2. In a shovel, the combination of a blade comprising a plurality of sections hinged together; releasable means for holding said sections extended in operative relation; and a handle releasably connected to said blade.

3. In a shovel, the combination of a blade comprising a plurality of sections hinged together and provided with perforated projecting lugs; an alinement pin insertible through the perforations in said lugs and serving when in position to hold said sections in operative relation; and a handle releasably connected to said blade.

4. In a shovel, the combination of a blade comprising a plurality of sections hinged together; an alining member adapted releasably to engage said sections and serving when so engaged to retain said sections in operative relation; and a handle releasably connected to said blade and comprising a plurality of separable sections each approximately equal in length with the blade, whereby the folded blade may house the handle sections in the dismounted condition of the shovel.

In testimony whereof I have signed my name to this specification.

OSWALD PARADIS.